G. W. BANKER.

Can for Oil.

No. 8,903. Reissued Sept. 23, 1879.

Witnesses:

Henry Eichling

A. S. Fitch

Inventor:

George W. Banker.

By J. P. Fitch

Atty.

THE NORRIS PETERS CO., PHOTO-LITHO., WASHINGTON, D. C.

UNITED STATES PATENT OFFICE.

GEORGE W. BANKER, OF BROOKLYN, NEW YORK.

IMPROVEMENT IN CANS FOR OIL

Specification forming part of Letters Patent No. 214,017, dated April 8, 1879; Reissue No. 8,903, dated September 23, 1879; application filed August 11, 1879.

*To all whom it may concern:*

Be it known that I, GEORGE W. BANKER, of Brooklyn, Kings county, State of New York, have invented an Improvement in Cans for Oils and other Liquids, of which the following is a specification, reference being had to the accompanying drawings, forming part of the same.

Cans for holding and transporting oil and other fluids, formed of metal and of other suitable material, have been made, provided with wooden cases, and with trunnions for supporting the can on standards connected with the case while the can is being tilted to pour its contents.

My invention consists in the improvements in this class of combined can and case herein described and claimed.

Figure 1:
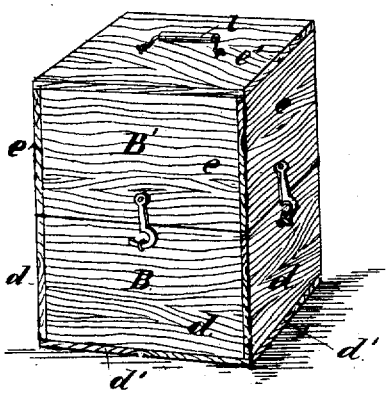
Figure 2:
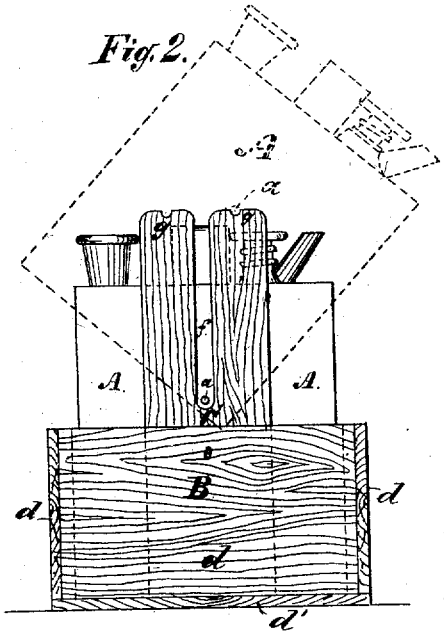
Figure 3:
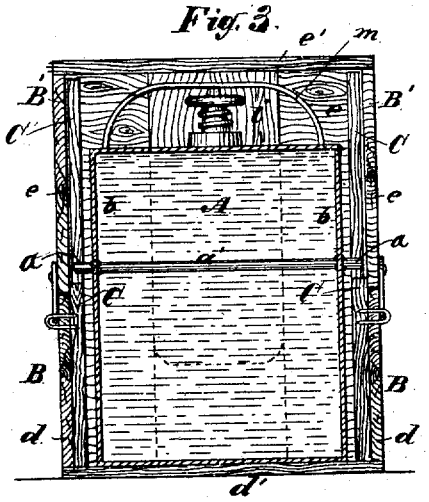
Figure 4:
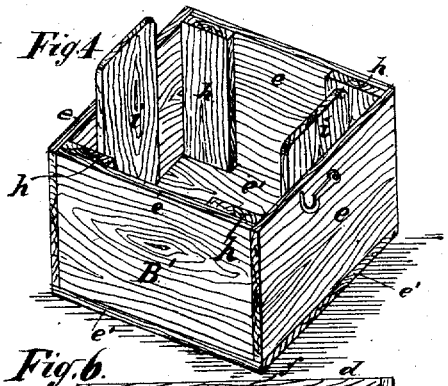
Figure 5:
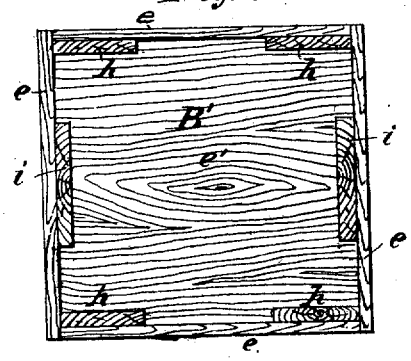
Figure 6:
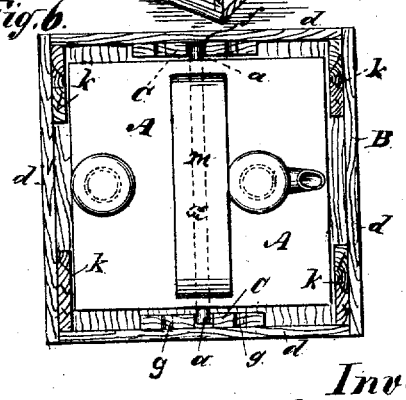

Figure 1 is an external perspective view of my improved case for the can. Fig. 2 is a side elevation, showing the cover of the case removed, bringing into view, as shown in full lines, the can resting in the bottom part of the case, and in dotted lines the can elevated and supported by its trunnions on standards connected with the case. Fig. 3 is a vertical central section of my can and case, with the can inclosed in the case. Fig. 4 is a perspective view of the upper part of the case removed from the lower part and reversed. Fig. 5 is a plan or a view looking directly down upon Fig. 4. Fig. 6 is a plan or view of the lower part of the case with the can in it.

A is the can, which may be made of metal, or of earthenware or glass incased in metal, or of any other suitable material; and it may have the rectangular form shown in the drawings, or any desired appropriate form.

The case, made of wood or its equivalent, is formed of two parts—the base or lower part, B, formed of the bottom *d'* and sides *d d d d*, and the upper part, B', formed of the top *e'* and sides *e e e e*—the two parts being placed together so that the sides *e e e e* rest upon and are in the same vertical plane, respectively, with the sides *d d d d*, as shown in the drawings, and may be secured, the one part to the other, by hooks and staples, as shown.

*a'* is a metal rod, which passes through opposite sides *b b* of the can from side to side, near the middle of the can, vertically, the ends projecting beyond the sides and forming trunnions *a a*. This rod is secured by soldering to the said sides *b b* where it passes through them.

C C are standards or supports, which serve to secure and maintain the adjustment of the sides *e* of the upper part, B', upon and in the same vertical plane with the sides *d* of the lower part, B, when the two parts are put together to form the body of the case, and for supports on which the trunnions *a' a'* rest when the can is raised into the position shown in Fig. 2. They may also serve to stay and strengthen the sides of the case with which they are connected. The box being made of wood, it is preferable to have the grain of the wood run horizontally. The standards C C are formed of pieces of wood, secured on the inner faces of two of the sides *d*, preferably with the grain of the wood of which the said standards are formed running vertically or across the grain of the said sides.

The portion of the standards within the lower part, B, of the case may, if preferred, be wide enough to cover the entire inner surface of the said sides to which they are secured, while the portion extending upward from the said lower part, B, into the upper part, B', against the inner faces of the sides *e*, may be made narrower, as seen plainly in Fig. 2.

The upper portion of the said standards may be slotted, as seen at *f* in Fig. 2, and the trunnions *a a* fitted to slide in said slots *f*. If preferred, these standards, instead of being slotted, as at *f*, may rise from the bottom B on one side of the trunnions *a a*, instead of being formed into two branches by the slot *f*, as shown in the drawings, the respective spaces between the cleats *h h h h*, hereinafter described, being made only wide enough to receive the said single branches of the standards.

The upper end surfaces of the standards are provided with notches *g g* to receive the trunnions when the can is raised into position, as in Fig. 2.

The cover B' may be provided with cleats *h h h h*, secured to its sides, leaving between them on the respective sides spaces equal in width to the width of the standards C C, so that when the upper part, B', is put onto the lower part, B, the said standards will fit into said spaces. Cleats or stays *i i* may be secured to the inner faces of two of the sides *e* of the cover B′, with the grain of the wood running vertically, or across that of said sides. They may be secured at about the center of the sides and project downward beyond the upper part; and said stays being narrower than the said sides, cleats *k k k k* are secured to two of the sides *d* of the lower part, B, with the grain of the wood crossing that of the sides, the space between said cleats on each side being equal to the width of the projecting ends of the stays *i i*, so that when B′ is put onto B the said cleats will fit into said spaces.

The can, which should fit snugly within the said cleats and stays in the case, may be provided with any desired suitable nozzle and spout or faucet, and with a handle, as shown at *m*. The top of the case may also be provided with a handle, as at *l*; or an opening may be made in said top, allowing the handle attached to the can to project through said opening.

To operate the can it is only necessary to remove the upper part of the case from the lower part and raise the can, and allow the trunnions *a′ a′* to rest on the top of the standards C C, when the can may be tilted for pouring fluid from it.

It is desirable that the case for this class of cans, designed for holding and transporting oil and other fluids, should possess great strength to endure the rough usage to which they are subjected.

By the combination of parts described and shown, practically the strength of a double case, with the grain of the wood of the inner case crossing that of the outer, is secured.

What I claim as new, and desire to secure by Letters Patent, is—

1. A wooden case for oil-cans, divided at or near the center into two parts, B and B′, the part B having standards C, that extend up into part B′, and are provided with bearings for the trunnions *a* of the can, and serve the purpose of securing and maintaining the adjustment of the part B′ on the part B, and also as supports upon which the can may be supported and tilted, as and for the purpose described.

2. A wooden case for oil-cans, divided at or near the center into two parts, B and B′, the part B having standards C, that extend into part B′, with the grain of the wood of said standards crossing the grain of the wood of the sides *d*, to which they are attached, thus serving the double purpose of supporting the can on its trunnions, so that the can may be tilted, and of strengthening the sides *d*, as described.

GEO. W. BANKER.

Witnesses:
JOHN G. H. MEYERS,
W. FITCH.